United States Patent
Ochiai

(10) Patent No.: US 11,494,494 B2
(45) Date of Patent: Nov. 8, 2022

(54) APPARATUS WITH EXCHANGEABLE COMMUNICATION MODULE AND APPLICATION MODULE, APPLICATION MODULE, AND METHOD

(71) Applicant: YOKOGAWA ELECTRIC CORPORATION, Tokyo (JP)

(72) Inventor: Satoru Ochiai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 256 days.

(21) Appl. No.: 16/860,052

(22) Filed: Apr. 27, 2020

(65) Prior Publication Data
US 2020/0364341 A1    Nov. 19, 2020

(30) Foreign Application Priority Data
May 16, 2019   (JP) .............................. JP2019-093151

(51) Int. Cl.
| | |
|---|---|
| G06F 21/57 | (2013.01) |
| G06F 8/65 | (2018.01) |
| G06F 21/73 | (2013.01) |
| G06F 21/78 | (2013.01) |

(52) U.S. Cl.
CPC .............. G06F 21/572 (2013.01); G06F 8/65 (2013.01); G06F 21/73 (2013.01); G06F 21/78 (2013.01)

(58) Field of Classification Search
CPC .......... G06F 21/572; G06F 8/65; G06F 21/73; G06F 21/78
See application file for complete search history.

(56) References Cited

U.S. PATENT DOCUMENTS

| | | | |
|---|---|---|---|
| 7,243,347 B2 * | 7/2007 | Palmer ...................... | G06F 8/65 |
| | | | 717/170 |
| 11,120,136 B1 * | 9/2021 | BeSerra .................. | G06F 8/656 |
| 2005/0278461 A1 | 12/2005 | Ohta | |
| 2009/0132816 A1 * | 5/2009 | Lee ........................ | G06F 21/575 |
| | | | 713/186 |
| 2012/0017044 A1 * | 1/2012 | George ..................... | G06F 8/63 |
| | | | 711/E12.001 |
| 2013/0120106 A1 * | 5/2013 | Cauwels .................. | A61B 5/01 |
| | | | 361/728 |

FOREIGN PATENT DOCUMENTS

| | | |
|---|---|---|
| JP | H04149606 A | 5/1992 |
| JP | 2002006943 A | 1/2002 |
| JP | 2005353073 A | 12/2005 |
| WO | 2011105998 A1 | 9/2011 |

OTHER PUBLICATIONS

Extended European Search Report for European Patent Application No. 20172231.1, issued by the European Patent Office dated Oct. 28, 2020.

Office Action issued for counterpart Japanese Application No. 2019-093151, issued by the Japanese Patent Office dated Dec. 14, 2021 (drafted on Dec. 8, 2021).

* cited by examiner

Primary Examiner — Zahid Choudhury

(57) ABSTRACT

Provided is an apparatus including a communication module including a processor and a communication unit; and an application module detachably coupled to the communication module, wherein the application module includes a functional unit including at least one of a sensor, an actuator, or a communication port that is to be connected to at least one of an external sensor or an external actuator, and an application module memory for storing firmware that is executed by the processor.

9 Claims, 10 Drawing Sheets

APPARATUS WITH EXCHANGEABLE COMMUNICATION MODULE AND APPLICATION MODULE, APPLICATION MODULE, AND METHOD

The contents of the following Japanese patent application(s) are incorporated herein by reference:
2019-093151 filed in JP on May 16, 2019.

BACKGROUND

1. Technical Field

The present invention relates to an apparatus, a communication module, an application module, and a method.

2. Related Art

In recent years, the Internet of Things (IoT) and Industrial IoT (IIoT) have attracted attention. For example, in a plant such as a factory production line, a large number of field devices having a communication function including sensors or actuators are disposed, and integration of monitoring or control of the production line by a system to which these are connected is being advanced.

In a conventional field device, since a communication unit for performing communication and an application unit for performing measurement and the like are integrated into one module, it has been difficult for a user to detach one of them and replace it with a new one. In addition, since the firmware for operating the device is stored outside of the application unit, even if the user wants to change only a part of the sensor or the like, it is necessary for the user to change the entire device.

SUMMARY

In order to solve the above problems, in a first aspect of the present invention, an apparatus is provided. The apparatus may comprise a communication module including a processor and a communication unit. The apparatus may comprise an application module that is detachably coupled to the communication module. The application module may include a functional unit including at least one of a sensor, an actuator, or a communication port that is to be connected to at least one of an external sensor or an external actuator. The application module may include an application module memory for storing firmware that is executed by the processor.

The processor, by executing the firmware, may control the functional unit and perform communication via the communication unit with a device to which the apparatus is connected.

The communication module may further include a firmware memory including a firmware region for storing the firmware that is obtained from the application module. The processor may execute the firmware stored in the firmware region of the firmware memory.

The processor, during a start-up process, may obtain identification information from the application module that is coupled to the communication module, and may obtain the firmware stored in the application module memory and store the firmware in the firmware region of the firmware memory in response to the identification information that has been obtained not matching identification information associated with the firmware stored in the firmware memory.

The application module memory may store one or more pieces of firmware that are executed by the processor. During the start-up process, the processor may store, in the firmware memory, the firmware that corresponds to a communication protocol used by the communication module among the one or more pieces of firmware stored in the application module memory.

The application module memory may store version information of the firmware in association with the firmware. During a start-up process, the processor may determine whether or not to store the firmware that is stored in the application module memory in the firmware region of the firmware memory based on a result of comparing the version information of the firmware stored in the firmware memory and the version information associated with the firmware stored in the application module memory.

The processor, during the start-up process, may store the firmware stored in the application module memory in a backup region of the firmware memory and restart the processor. The processor may store the firmware that is stored in the backup region of the firmware memory in the firmware region of the firmware memory during the restart.

The processor may download a piece of firmware from a device to which the apparatus is connected and store the downloaded firmware in the application module memory.

The processor stores data relating to at least one functional unit and the communication unit in application module memory. The processor may store the data that is stored in the application module memory in a data memory inside the communication module and use the data that is stored to perform processing.

In a second aspect of the present invention, a communication module is provided. The communication module may include a connection unit for detachably coupling an application module including a functional unit including at least one of a sensor, an actuator, or a communication port that is to be connected to at least one of an external sensor or an external actuator. The communication module may include a processor. The communication module may include a communication unit. The processor may execute firmware stored in an application module memory included in the application module that is coupled by the connection unit In a third aspect of the present invention, an application module is provided. The application module may include a connection unit for detachably coupling a communication module including a processor and a communication unit. The application module may include a functional unit including at least one of a sensor, an actuator, or a communication port that is to be connected to at least one of an external sensor or an external actuator. The application module may include an application module memory for storing firmware that is executed by the processor. The application module may provide the firmware stored in the application module memory to the processor.

In a fourth aspect of the present invention, a method is provided. The method may include coupling, by a communication module including a processor and a communication unit, the communication module and an application module detachable from the communication module, wherein the application module includes a functional unit including at least one of a sensor, an actuator, or a communication port that is to be connected to at least one of an external sensor or an external actuator, and includes an application module memory for storing firmware that is executed by the processor. The method may include providing, by the application module, the firmware that is executed by the processor to the processor. The method may include executing, by the processor, the firmware provided from the application module.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the present invention, but the following embodiments do not limit the invention according to the claims. In addition, not all combinations of the features described in the embodiments are necessarily essential to the solution of the invention.

Figure 1:
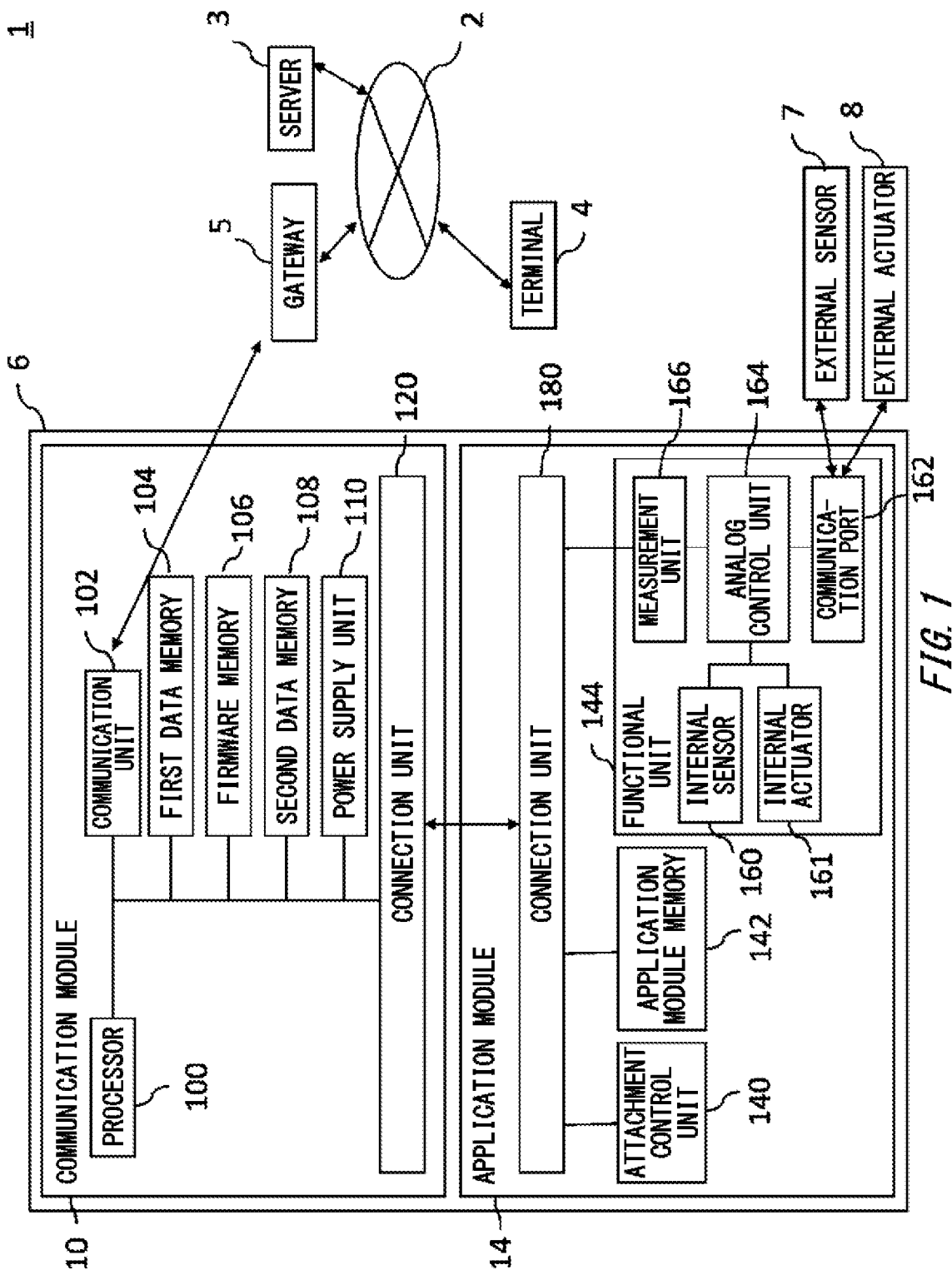
FIG. 1 shows a system 1 according to the present embodiment.

FIG. 1 shows a system 1 according to the present embodiment. The system 1 monitors or controls each device of, for example, a production line in a plant or the like. The system 1 includes a network 2, a server 3, a terminal 4, a gateway 5, one or more of an apparatus 6, an external sensor 7, and an external actuator 8. For example, the plant includes chemical plants and other industrial plants, plants that manage and control wells of gas fields and oil fields and the like and their surroundings, plants that manage and control generation of power such as hydroelectric, thermal, and nuclear power, plants that manage and control energy harvesting from solar and wind power and the like, or plants that manage and control water supply and sewage, dams, and the like. It is noted that the abovementioned plants are only examples, and the plants are not limited to the abovementioned plants.

The network 2 connects the server 3, the terminal 4, and the apparatus 6 wirelessly or by wire. The network 2 may be the Internet, a wide area network, a local area network, or the like.

The server 3 provides various types of information to the one or more apparatuses 6 via the network 2. The server 3 provides information corresponding to a request from the terminal 4 to the apparatus 6. The server 3 transmits various types of information received from the apparatus 6 to the terminal 4, to provide the user of the terminal 4 with the information. The server 3 may be accomplished by a computer such as a server computer, or may be an apparatus accomplished by a plurality of computers. The server 3 may provide a cloud computing system.

The terminal 4 transmits an input from the user to the apparatus 6 via the server 3 or directly. The terminal 4 may be a computer such as a PC (personal computer), a tablet computer, a smartphone, a workstation, a server computer, or a general purpose computer, or a computer system to which a plurality of computers are connected.

When connecting the apparatus 6 to the network 2, the gateway 5 performs protocol conversion when the communication protocols of the apparatus 6 and a connected device (for example, the server 3, the terminal 4, or an external server) are different.

The apparatus 6 may be a field device. The apparatus 6 may include, for example, a sensor device such as a flow meter and a temperature sensor, a valve device such as a flow control valve and an on-off valve, an actuator device such as a fan and a motor, and/or other devices installed at a plant site. It is noted that the abovementioned devices are only examples, and the devices are not limited to the abovementioned devices. The apparatus 6 performs measurement or monitoring by a sensor or the like, or controls an actuator or the like. The apparatus 6 comprises a communication module 10 and an application module 14. The communication module 10 and the application module 14 are detachably coupled to each other by a connection unit 120 included in the communication module 10 and a connection unit 180 included in the application module 14.

The communication module 10 connects the apparatus 6 to the network 2 via the gateway 5. The communication module 10 also executes firmware to perform various types of controls of the application module 14 connected to the communication module 10. The firmware exists for each type of communication protocol used by the communication module 10 for its connection to the network 2 and for each type of function (functional unit 144) of the application module 14. Each piece of firmware is a program that is executed for realizing functions such as measurement, control, or communication of the corresponding communication module 10 and the application module 14. As an example, the communication module 10 acquires sensor information from an integrated sensor 160 or the external sensor 7, and transmits the sensor information to the connected device via the network 2. As an example, the communication module 10 provides control information received from the connected device to the application module 14 to control an integrated actuator 161 or the external actuator 8. In addition, the communication module 10 receives one or more pieces of firmware from the connected device and updates the firmware. The communication module 10 includes a processor 100, a communication unit 102, a first data memory 104, a firmware memory 106, a second data memory 108, a power supply unit 110, and the connection unit 120.

The processor 100 is connected to the communication unit 102, the first data memory 104, the firmware memory 106, the second data memory 108, the power supply unit 110, and the connection unit 120. The processor 100, by executing the firmware, controls the functional unit 144 of the application module 14, and performs wired or wireless communication with the connected device of the apparatus 6 via the communication unit 102. Here, the processor 100 executes the firmware stored in an application module memory 142 included in the application module 14 coupled with the communication module 100 by the connection units 120 and 180. For example, the processor 100 causes the functional unit 144 to acquire the sensor information from the integrated sensor 160 and to control the integrated actuator 161 to operate.

The communication unit 102 is connected to the network 2 via the gateway 5 or a wire. The communication unit 102 may communicate with the connected device in accordance with communication specifications by protocol control by the processor 100. In addition, the communication unit 102 may communicate with the connected device without using the network 2, but by using NFC (Near Field Communication) or Bluetooth (registered trademark) communication technology. The communication unit 102 may be directly connected to the terminal 4 or the like, by wire, or communicatively connected wirelessly to the terminal 4 or the like, to perform communication with the connected device (the terminal 4 or the like) without using the network 2.

The processor 100 stores data relating to at least one functional unit 144 and the communication unit 102 in the first data memory 104. The first data memory 104 may store data used by the processor 100 to control the at least one functional unit 144 and the communication unit 102. The first data memory 104 may store a coefficient (constant) used for correction of sensor information and the like. In addition, the first data memory 104 may store various types of information received from the connected device via the communication unit 102 or from the application module 14 via the connection units 120 and 180. The first data memory 104 may be a volatile memory such as a dynamic random access memory (DRAM) or a static random access memory (SRAM).

The firmware memory 106 stores firmware executed by the processor 100. The firmware memory 106 may include a non-volatile memory such as an erasable programmable read only memory (EPROM or flash memory), an electrically erasable programmable read only memory (EEPROM), a ferroelectric random access memory (FRAM (registered trademark)), a compact disc read only memory (CD-ROM), or a digital versatile disk (DVD).

The second data memory 108 stores information specific to the communication module 10. For example, the second data memory 108 stores the type, the remaining life, or the used power amount of the battery in the power supply unit 110. The second data memory 108 may be a non-volatile memory such as an erasable programmable read only memory (EPROM or flash memory), an EEPROM, a FRAM (registered trademark), a CD-ROM, or a DVD.

The power supply unit 110 is connected to the connection unit 120. The power supply unit 110 supplies power to each element of the communication module 10 as well as to the application module 14 via the connection units 120 and 180. The power supply unit 110 may include a battery which its battery life may be appropriately diagnosed according to a request from the processor 100.

The connection unit 120 is detachably connected to the connection unit 180 of the application module 14. The connection unit 120 is electrically connected to the connection unit 180 to communicatively connect the communication module 10 and the application module 14. The connection unit 120 may include a connector terminal.

The application module 14 includes the integrated sensor 160, the integrated actuator 161, the external sensor 7, and the external actuator 8, and controls the integrated actuator 161 and the external actuator 8 based on the measurements by the integrated sensor 160 and the external sensor 7, the sensor information provided to the communication module 10, or the control information provided from the communication module 10. In addition, the application module 14 provides the firmware stored in the application module memory 142 to the processor 100 via the firmware memory 106. The application module 14 includes the attachment control unit 140, the application module memory 142, the functional unit 144, and the connection unit 180.

The attachment control unit 140 is connected to the connection unit 180. The attachment control unit 140 transmits an attachment signal to the communication module 10 in response to receiving an attachment confirmation signal to check whether the application module 14 is attached to the communication module 10 from the communication module 10. In addition, the attachment control unit 140 may perform power control for suppressing power consumption of the application module 14 until receiving the attachment confirmation signal from the communication module 10.

The application module memory 142 stores the firmware executed by the processor 100. The application module memory 142 may be a non-volatile memory such as an EPROM, a flash memory, an EEPROM, a FRAM (registered trademark), a CD-ROM, or a DVD.

The functional unit 144 is connected to the connection unit 180 to provide a sensing function or an actuator function. The functional unit 144 includes the integrated sensor 160 and the integrated actuator 161 along with a communication port 162, an analog control unit 164, and a measurement unit 166.

The integrated sensor 160 is connected to the analog control unit 164 to provide the sensor information acquired by the integrated sensor 160 to the analog control unit 164, or the integrated actuator 161 is connected to the analog control unit 164 to execute an operation corresponding to a control signal provided from the analog control unit 164. The integrated sensor 160 may be, for example, a temperature sensor such as a thermocouple sensor, a humidity sensor, a pressure sensor, a vibration sensor, a corrosion sensor, an environment sensor, a flow sensor, or a level sensor. The integrated actuator 161 may be a relay, an electric valve, or a heater.

The communication port 162 is used for connecting to at least one of the external sensor 7 or the external actuator 8. The communication port 162 may be communicatively connected to at least one of the external sensor 7 or the external actuator 8 by wire or wirelessly. The communication port 162 may be communicatively connected to at least one of the external sensor 7 or the external actuator 8 using, for example, NFC communication or Bluetooth (registered trademark) communication technology. In addition, the communication port 162 is connected to the analog control unit 164. The communication port 162 acquires the sensor information from the external sensor 7 and provides the sensor information to the analog control unit 164. In addition, the communication port 162 provides the control signal obtained from the analog control unit 164 to the external actuator 8. The communication port 162 may include a general purpose input/output terminal and a communication cable. In addition, the communication port 162 may include a conductor cable that is electrically connected to the external sensor 7 and the external actuator 8.

The analog control unit 164 is connected to the measurement unit 166. The analog control unit 164 performs signal pre-processing or post-processing such as amplification and filtering of a signal provided from the measurement unit 166 or the communication port 162 in response to a request from the processor 100. As an example, the analog control unit 164 amplifies or filters the sensor signal acquired from the integrated sensor 160 or the external sensor 7. In addition, the analog control unit 164 may supply a current according to the control information obtained from the communication module 10 to the integrated actuator 161 or the external actuator 8. The analog control unit 164 may include, for example, an amplifier, a filter, an analog switch, or a comparator.

The measurement unit 166 is connected to the connection unit 180. The measurement unit 166 performs signal processing such as A/D conversion processing in response to a request from the processor 100, and performs transmission and reception of information with the processor 100. The measurement unit 166 may communicate with the processor 100 using general purpose communication such as SPI (Serial Peripheral Interface) or UART (Universal Asynchronous Receiver Transmitter) communication. The measurement unit 166 may include a field programmable gate array (FPGA) or a small CPU. In addition, the measurement unit 166 may be controlled directly by the processor 100 using one or more general purpose input/outputs (GPIO). Furthermore, the measurement unit 166 may include an A/D converter, a D/A converter, or a counter.

The connection unit 180 is used for detachably coupling the communication module 10 including the processor 100 and the communication unit 102 to the application module 14. The connection unit 180 may include a connection terminal. In the present embodiment, the connection unit 180 may enable its communication with the connection unit 120 using a serial communication protocol. Communication between the connection unit 180 and the connection unit 120 may be, for example, SPI communication or UART communication.

The external sensor 7 provides the sensor information acquired by the external sensor 7 to the analog control unit 164 via the communication port 162, or the external actuator 8 executes an operation according to the control signal provided from the analog control unit 164 via the communication port 162. The external sensor 7 may be, for example, a temperature sensor such as a thermocouple sensor, a humidity sensor, a pressure sensor, a vibration sensor, a corrosion sensor, an environment sensor, a flow sensor, or a level sensor. The external actuator 8 may be a relay, an electric valve, or a heater.

According to the above described system 1, since the communication module 10 and the application module 14 are detachably coupled by the connection units 120 and 180, the user can easily detach one of the modules to replace it with a new one.

In addition, according to the system 1, since the application module 14 holds the firmware, it is not necessary for the communication module 10 to hold the firmware corresponding to the coupled application module 14 in advance. For this reason, the user can combine the existing communication module 10 with application modules 14 of different function types including firmware corresponding to the communication specifications of the communication module 10. Accordingly, when a new application module 14 is developed and sold, the user can purchase the new application module 14 alone and immediately operate the apparatus 6 by coupling the new application module 14 to the existing communication module 10. It is also unnecessary for the developer to upgrade the entire apparatus 6 and to perform a release test of the firmware for each device every time the function of the application module 14 is changed, and thus the process steps and the period for development can be reduced.

According to the system 1, since the firmware is stored in the application module memory 142 inside the application module 14, even if the user exchanges the entire communication module 10 for battery replacement or the like, the apparatus 6 can easily continue its processing before the exchange by executing the firmware inside the application module 14 after the exchange.

Figure 2:
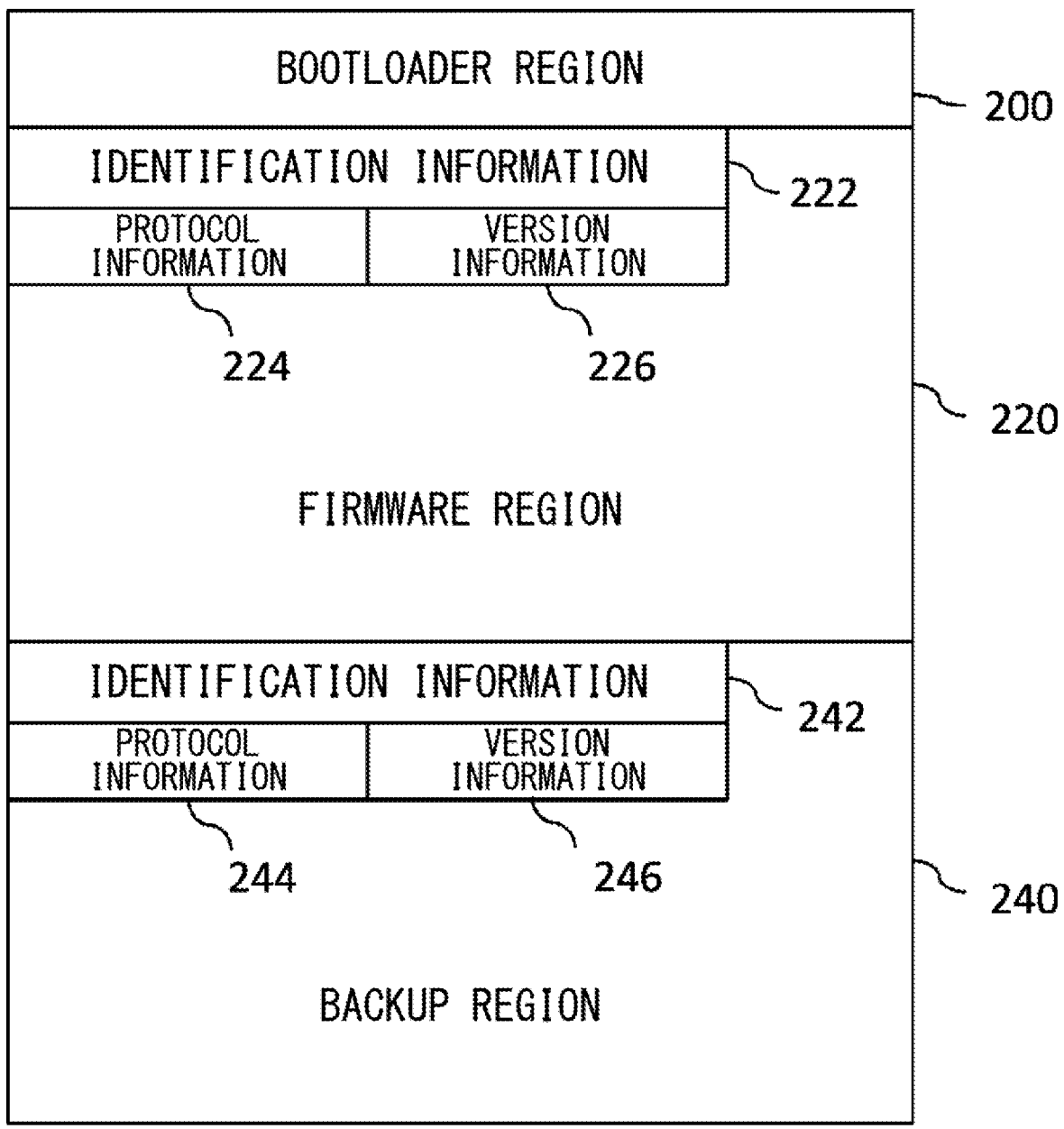
FIG. 2 shows a configuration of a firmware memory 106 according to the present embodiment.

FIG. 2 shows a configuration of a firmware memory 106 according to the present embodiment. The firmware memory 106 has a bootloader region 200 of the processor 100, a firmware region 220 for storing the firmware obtained from the application module 14, and a backup region 240.

The bootloader region 200 stores a bootloader for starting up the firmware. The bootloader may be a program for causing the apparatus 6 to execute a common initialization process or the like regardless of the type of the application module 14 to be coupled.

The firmware region 220 stores firmware that is read out and executed by the processor 100. Furthermore, the firmware region 220 stores identification information 222 of the application module 14 having the functional unit 144 to be controlled when the firmware is executed, protocol information 224 corresponding to a communication protocol of a communication process executed by the firmware, and version information 226 of the firmware. It is noted that, for convenience, the firmware region 220 may store any piece of firmware corresponding to the communication protocol used by the processor 100 of the communication module 10 to execute the firmware and to perform communication in an initial state such as at the time of factory shipment of the communication module 10.

The backup region 240 stores backup of the firmware provided from the application module 14. Furthermore, the backup region 240 stores identification information 242 of the application module 14 supported by the firmware that has been backed up, protocol information 244 of the firmware, and version information 246 of the firmware.

The identification information is information for identifying the application module 14 or a sensor/actuator that is included therein. The identification information may be product identification information that indicates a model number or the like of the application module 14 or the sensor/actuator. In addition, the identification information may indicate the product type of the application module 14 or the sensor/actuator, such as a temperature sensor or a pressure sensor. The identification information may be a digit or a character string, or may be a combination of a digit and a character string.

The protocol information is information indicating the communication protocol for the processor 100 of the communication module 10 to execute the firmware and to perform communication with the server 3, the terminal 4, or the like. The protocol information is a communication protocol, for example, LoRa (registered trademark), SIGFOX (registered trademark), Random Phase Multiple Access (RPMA), Narrow Band IoT (NB-IoT), HART (registered trademark), BRAIN, Foundation Fieldbus (registered trademark)), WirelessHART (registered trademark) or a communication protocol defined by ISA100.11a or the like.

The version information is information that indicates the version or revision of the corresponding firmware. The version information is updated by a revision of the firmware such as addition of a new function, correction of a bug, or change to a specification. The version information may be a digit or a character string, or may be a combination of a digit and a character string. The digit part of the version information may include a decimal point, and the digit part may indicate that the larger the value of the digits, the newer the developed firmware.

Figure 3:
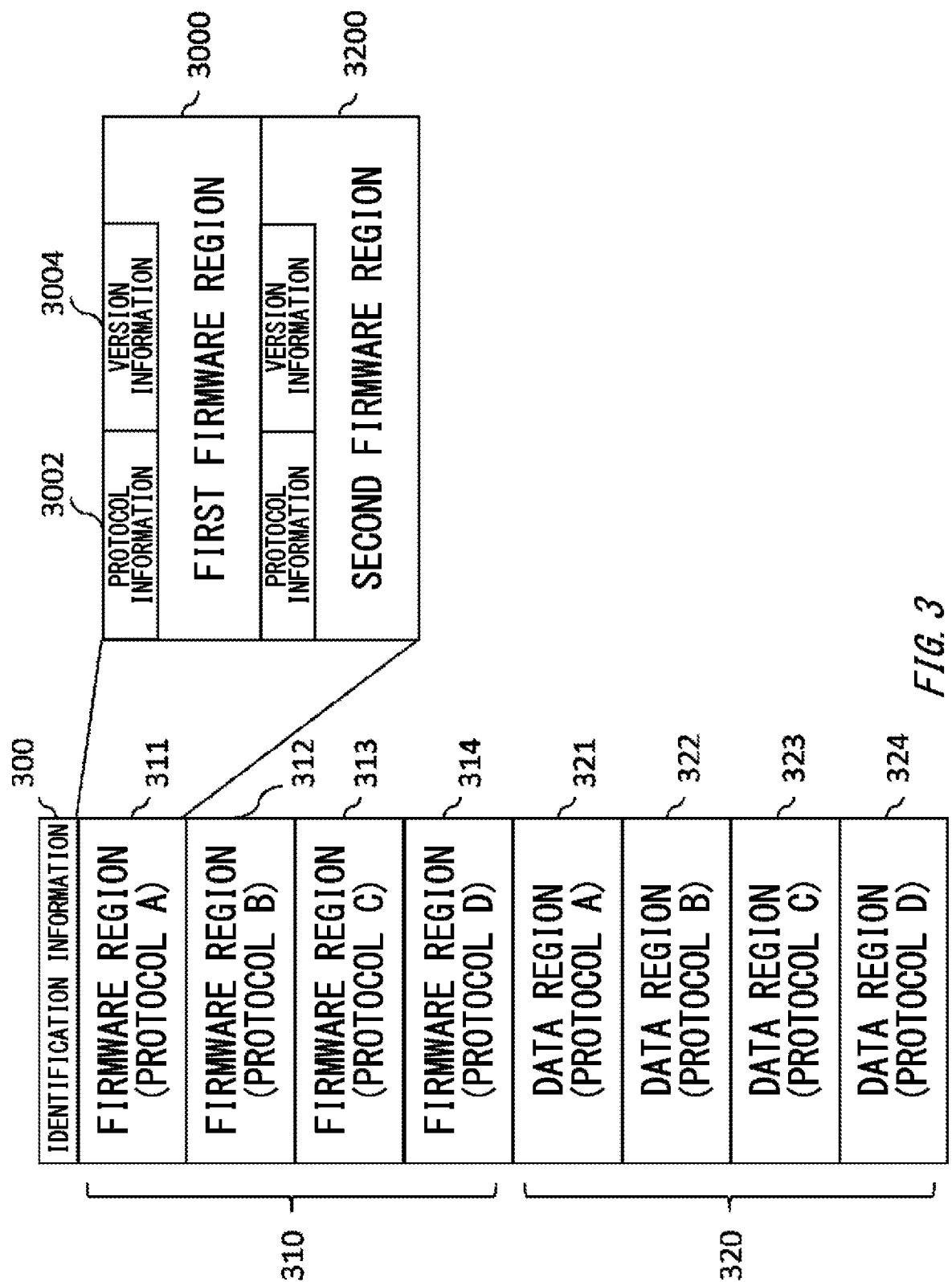
FIG. 3 shows a configuration of an application module memory 142 according to the present embodiment.

FIG. 3 shows a configuration of an application module memory 142 according to the present embodiment. In the present embodiment, the application module memory 142 includes an identification information storage region for storing identification information 300, one or more firmware regions 310 for storing one or more pieces of firmware, and one or more data regions 320 respectively provided in correspondence with the firmware stored in the firmware region 310. In FIG. 3, the application module memory 142 stores a plurality of pieces of firmware and includes the identification information storage region, a plurality of firmware regions 310, and a plurality of data regions 320 having different communication protocols.

The identification information storage region stores the identification information 300 of the firmware stored in the plurality of firmware regions 310. Alternatively, the identification information 300 may be stored in another ROM or a register inside the application module 14.

The plurality of firmware regions 310 may store a plurality of pieces of firmware having the same identification information. For example, firmware regions 311 to 314 are for pieces of firmware for operating temperature sensors of the same model number, and firmware regions 311, 312, 313, and 314 may respectively correspond to protocols A, B, C, and D. It is noted that all firmware regions 310 inside the application module memory 142 may store firmware, and there may be an empty firmware region 310 in which no firmware is stored.

Each of the firmware regions 311 to 314 may have a first firmware region 3000 and a second firmware region 3200 inside each of their own firmware regions 311 to 314. Either one of the first firmware region 3000 and the second firmware region 3200 is an active region and may be accessed by the processor 100 via the connection units 120 and 180. The other is an inactive region, and the processor 100 cannot access the inactive region. The active region may store the latest piece of firmware that can be used by the processor 100, and the inactive region may store the previously downloaded firmware. In the present embodiment, the first firmware region 3000 and the second firmware region 3200 may further store protocol information 3002 and version information 3004 of the firmware in association with the firmware.

Each data region 320 stores data corresponding to each piece of firmware supporting different communication protocols. The data includes information specific to the corresponding piece of firmware or to the application module 14. For example, the data may include a communication address supported by the corresponding piece of firmware, and may include, as an example, an EUI-64 identifier, which is a 64-bit identifier, uniquely assigned to the communication device. In addition, when the supported communication protocol corresponds to wireless communication, the data may include an encryption key that is exchanged between the apparatus 6 and the gateway 5 in advance by provisioning. The data may include scheduling information set by the connected device when the supported communication protocol corresponds to fieldbus communication. In addition, the data may include a parameter such as a value for calibration of the sensor/actuator that is controlled by the corresponding piece of firmware or a coefficient used for correction of sensor information or actuator control information, and may include a serial number of the device of the application module 14.

According to the present embodiment, since the application module memory 142 stores a plurality of pieces of firmware and data that are supporting different communication protocols, the communication module 10 can operate the existing application module 14 by executing the firmware based on the data that are corresponding to the communication protocol supported by the communication module 10 and stored in the application module memory 142. Therefore, the combination of application module memory 142 is not limited to a combination with a specific communication module 10. For example, even when changing the communication environment, the user can continue using the existing application module 14 by changing the communication module 10 alone. In addition, since the application module memory 142 stores various types of data, even if only the communication module 10 is replaced alone at the time of battery replacement or the like, the user can immediately start using the apparatus 6 with the same settings and continue to execute the same operation.

It is noted that the application module memory 142 may have an empty firmware region 310 and an empty data region 320 in which no firmware or data is stored. In addition, when the application module memory 142 stores one piece of firmware, the application module memory 142 may include one firmware region 310 and one data region 320, and may include a plurality of firmware regions 310 and a plurality of data regions 320. When the application module memory 142 has a plurality of firmware regions 310 and a plurality of data regions 320, since the number of pieces of firmware is one, the application module memory 142 may have an empty firmware region 310 and an empty data region 320 in which no firmware or data is stored.

Figure 4:
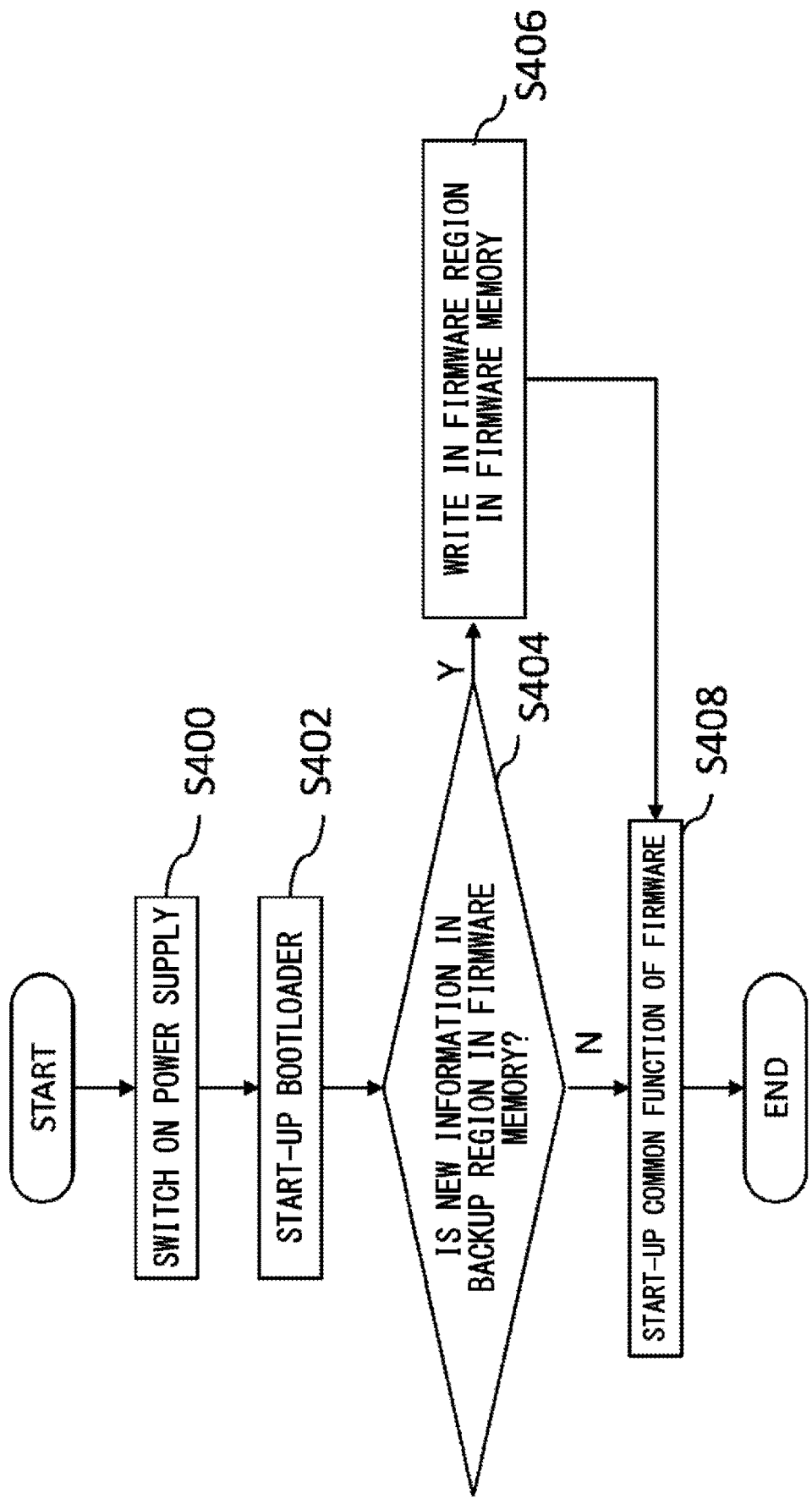
FIG. 4 shows operation of a bootloader during execution of start-up processing of an apparatus 6 according to the present embodiment.

FIG. 4 shows the operation of the bootloader during execution of a start-up process of the apparatus 6 according to the present embodiment. In S400, the user turns on the power of the power supply unit 110 of the communication module 10 to supply power to each element of the communication module 10.

In S402, the processor 100 reads out and executes the bootloader stored in the bootloader region 200 inside the firmware memory 106. Before or during the execution of the bootloader, the processor 100 may perform various types of self-diagnoses or various types of initialization processes such as checking memory size, checking the operation of the memory, or checking the communication environment.

In S404, the processor 100 determines whether or not new information is stored in the backup region 240. When the processor 100 determines that new information is stored, the processor 100 moves the process to S406. When new information is not confirmed, the processor 100 moves the process to S408. For example, the processor 100 may determine whether or not the identification information, the protocol information, and the version information of the firmware stored in the firmware region 220 and the firmware stored in the backup region 240 match. When the processor 100 determines that they do not match, the processor 100 may move the process to S406, and when the processor 100 determines that they do match, the processor 100 may move the process to S408.

In S406, the processor 100 updates the information in the firmware region 220 by writing the firmware, the identification information 242, the protocol information 244, and the version information 246 stored in the backup region 240 to each target region of the firmware region 220.

In S408, the processor 100 activates a common function of the firmware stored in the firmware region 220. Here, the common function of the firmware refers to a function that all of the firmware of the apparatus 6 has in common. The common function will be described below with reference to the processing shown in S500 to S510 of FIG. 5.

As described above, the processor 100 executes the bootloader and copies the firmware from the backup region 240 to the firmware region 220 when the apparatus 6 is started up. Therefore, the firmware in the firmware region 220 can be automatically updated in response to an update of the firmware in the backup region 240.

Figure 5:
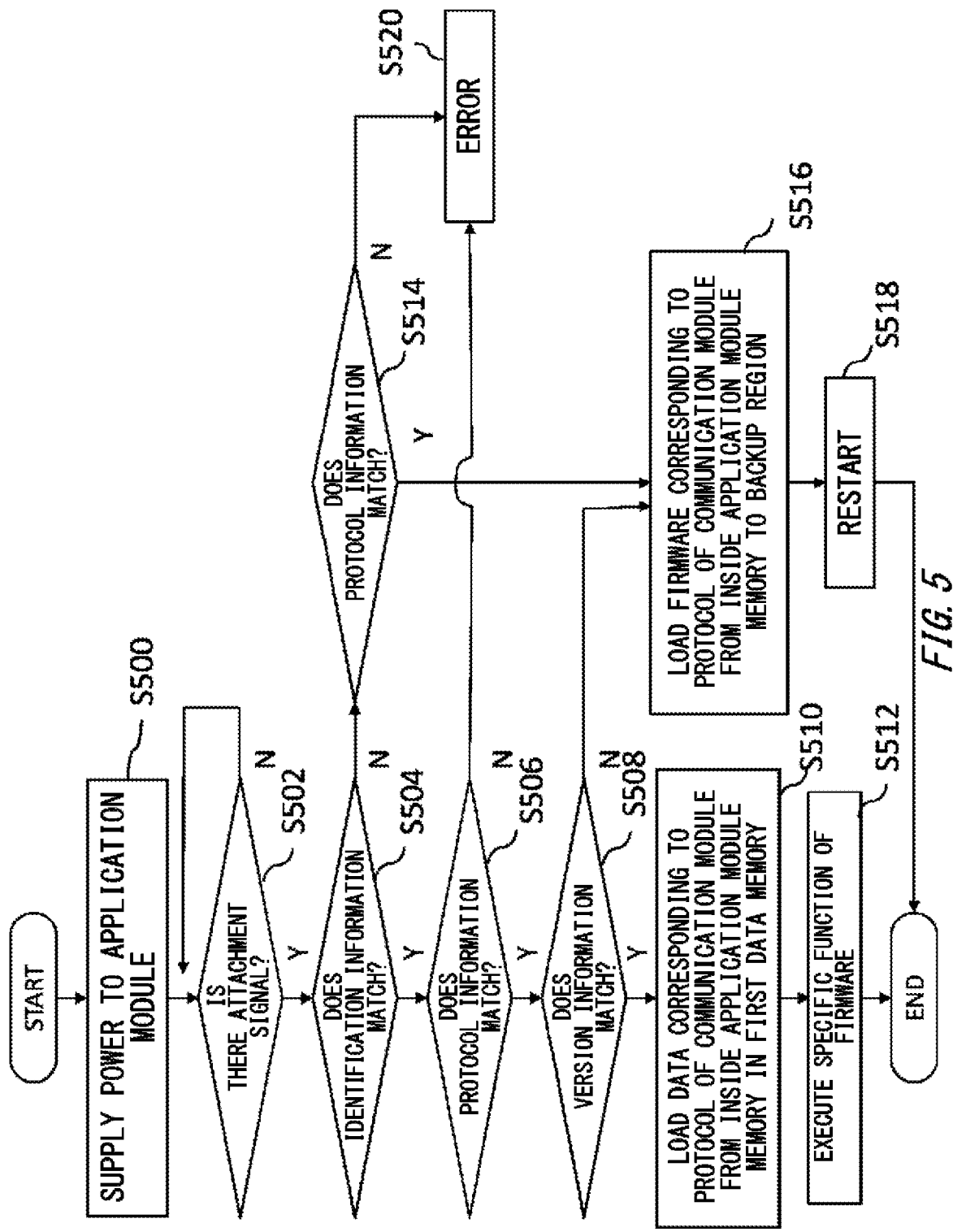
FIG. 5 shows operation of the apparatus 6 during execution of the start-up process and execution of a specific function according to the present embodiment.

FIG. 5 shows the operation of the apparatus 6 according to the present embodiment during execution of the start-up process and execution of a specific function. FIG. 5 shows an operation, during the execution of the start-up process of the apparatus 6, from the execution of the common function of the firmware shown in S408 of FIG. 4 to the execution of the specific function of the firmware. In S500, the power supply unit 110 supplies power to the application module 14 via the connection unit 120 in response to a request from the processor 100.

In S502, an attachment control unit 140 transmits, to the communication module 10, an attachment signal indicating that the application module 14 is attached to the communication module 10 via the connection units 120 and 180. In the present embodiment, the attachment control unit 140 may transmit the attachment signal to the communication module 10 in response to receiving an attachment confirmation signal for confirming that the application module 14 is attached to the communication module 10. When the processor 100 determines that the attachment signal from the attachment control unit 140 has been received, the processor 100 moves the process to S504, and when the processor 100 determines that the attachment signal has not been received, the processor 100 waits until the attachment signal from the attachment control unit 140 is received in S502.

In S504, the processor 100 obtains the identification information 300 from the application module memory 142 inside the application module 14 coupled to the communication module 10, and determines whether or not the obtained identification information 300 and the identification information 222 associated with the firmware stored in the firmware region 220 inside the firmware memory 106 match. For example, at the time of battery replacement or the like, when the user uses the same application module 14 as in the previous start-up, or when the user changes the application module 14 to a new model of the same type as in the previous start-up, the two pieces of identification information match. On the other hand, when the user changes the application module 14 to a product type different from that at the time of the previous start-up such as, for example, when the user changes a temperature sensor to a pressure sensor, the two pieces of identification information do not match. When the processor 100 determines that the two pieces of identification information match, the processor 100 moves the process to S506, and when the processor 100 determines that the two pieces of identification information do not match, the processor 100 moves the process to S514.

In S506, the processor 100 determines whether or not there is firmware corresponding to the communication protocol used by the communication module 10 among one or more pieces of firmware stored in the application module memory 142. In the present embodiment, the processor 100 may make the determination by comparing the protocol information 3002 stored in the active region of each firmware region 310 inside the application module memory 142 with the protocol information 224 stored in the firmware region 220 inside the firmware memory 106. When there is firmware with matching protocol information, the processor 100 moves the process to S508, and when there is no firmware with matching protocol information, the processor 100 moves the process to S520.

In S508, the processor 100 compares the version information 3004 associated with the firmware that has been determined to have a matching communication protocol in S506 with the version information 226 of the firmware stored in the active region of the firmware region 220 inside the firmware memory 106, among the firmware stored in the firmware region 310 inside the application module memory 142. Then, based on the result of the comparison, the processor 100 determines whether or not to store the firmware stored in the application module memory 142 in the firmware memory 106. In the present embodiment, the processor 100 may determine to copy the firmware stored in the active region of the application module memory 142 to the firmware memory 106 when the firmware including the version information 3004 inside the application module memory 142 is newer than the firmware including the version information 226 inside the firmware memory 106. When the processor 100 determines that the firmware including the version information 3004 is not newer than the firmware including the version information 226, such as that the two pieces of version information match, the processor 100 moves the process to S510. When the processor 100 determines that the two pieces of version information do not match and the firmware including the version information 3004 inside the application module memory 142 is newer than the firmware including the version information 226 inside the firmware memory 106, the processor 100 moves the process to S516.

In addition, when the firmware including the version information 3004 inside the application module memory 142 is older than the firmware including the version information 226 inside the firmware memory 106, the processor 100 may determine to copy the firmware stored in the active region of the application module memory 142 to the firmware memory 106 and execute it. As an example, the processor 100 may make the determination in response to receiving a signal from a user commanding a downgrade process. For example, the processor 100 may make the determination in response to receiving a command of the downgrade process from a connected device operated by the user. In addition, in a case where the apparatus 6 includes an input means to which the command of the downgrade process is input from the user, the processor 100 may make the determination in response to an input to the input means. In this case, when the processor 100 determines that the firmware including the version information 3004 inside the application module memory 142 is not older than the firmware including the version information 226 inside the firmware memory 106, such as when the two pieces of version information match, the processor 100 moves the process to S510, and when the processor 100 determines that it is older, the processor 100 moves the process to S516.

In S510, the processor 100 stores data corresponding to the communication protocol used by the communication module 10 among the data region 320 inside the application module 14 (for example, a communication address or a calibration value of a sensor/actuator) in the first data memory 104 inside the communication module 10. In another embodiment, instead of the processor 100, an external controller (not shown) (for example, a Direct Memory Access (DMA) controller or the like) may store data from the application module memory 142 to the first data memory 104.

In S512, the processor 100 uses the data stored in the first data memory 104 to read out the firmware stored in the firmware region 220 of the firmware memory 106, execute the specific function of the firmware, and ends the process. The specific function of the firmware refers to a program set for each piece of firmware so that the target application module 14 can realize a target function. For example, the processor 100 may provide the sensor information acquired from the integrated sensor 160 and the external sensor 7 to the terminal 4 via the server 3 in response to a request from the terminal 4 or periodically. In addition, the processor 100 may receive control information from the terminal 4 via the server 3 and control the integrated actuator and the external actuator based on the control information in response to a request from the terminal 4 or periodically.

In addition, during the operation of the apparatus 6, the processor 100 may read out the data from the first data memory 104. When it is necessary to change the data, the processor 100 may write the data in the first data memory 104, and after a certain period of time elapses, write the data inside the first data memory 104 to the application module memory 142. As a result, it is possible to reduce the number of times of writing to the application module memory 142 and to improve the performance of the firmware as a whole.

In S514, similarly to S506, the processor 100 determines whether or not there is firmware corresponding to the communication protocol supported by the communication module 10 among the one or more pieces of firmware stored in the application module memory 142 in response to the two pieces of identification information not matching in S504. When there is firmware with matching protocol information, the processor 100 moves the process to S516, and when there is no firmware with matching protocol information, the processor 100 moves the process to S520.

In S516, the processor 100 obtains the firmware corresponding to the communication protocol used by the communication module 10 among the one or more pieces of firmware stored in the firmware region 310 inside the application module memory 142 and stores the firmware in the backup region 240 of the firmware memory 106. In the present embodiment, the processor 100 transmits a read out request to the application module 14. The application module 14 transmits the firmware stored in the active region of the firmware region 310 of the application module memory 142 to the processor 100 in response to receiving the read out request. The processor 100 stores the firmware received from the application module 14 in the backup region 240 of the firmware memory 106. In another embodiment, instead of the processor 100, an external controller (not shown) may copy the firmware from the application module memory 142 to the backup region 240. In addition, the processor 100 stores the protocol information 3002 and the version information 3004 corresponding to the firmware to be copied that is stored in the firmware region 310 inside the application module memory 142 to the target regions 244 and 246 of the backup region 240 of the firmware memory 106.

In S518, the processor 100 restarts the apparatus 6 and ends the process. In this case, after returning the process to S402 of FIG. 4 during the restart and causing the bootloader to execute the step, the processor 100 stores the firmware stored in the backup region 240 inside the firmware memory 106 in S404 to S406 of FIG. 4 in the firmware region 220 inside the firmware memory 106.

In S520, in response to determining that there is no firmware with matching protocol information in S506 to S514, the processor 100 outputs a signal indicating that there is no firmware corresponding to the communication protocol of the communication module 10 and ends the process. The processor 100 may transmit an error signal to the terminal 4 via the communication unit 102.

In this way, according to the present embodiment, if each device and the firmware have not been changed, the processor 100 can read out and execute the firmware that has already been stored in the firmware memory 106 as it is after the processor 100 has copied the data corresponding to the communication protocol supported by the communication module 10 from the application module memory 142 to the first data memory 104 during the start-up process. Therefore, the processor 100 can easily continue the process at the time of the previous execution of the firmware.

According to the present embodiment, when the application module 14 having identification information different from that at the time of the previous start-up is coupled to the communication module 10, the processor 100 automatically copies the firmware corresponding to the communication protocol supported by the communication module 10 from the application module 14 to the communication module 10 and executes it.

For this reason, for example, when changing the product type of the sensor or the like, the user can use the existing communication module 10 to quickly operate the application module 14 after the change.

According to the present embodiment, when the communication module 10 is coupled to the application module 14 having a different version of firmware from that at the time of the previous start-up, the processor 100 automatically copies the new version of the firmware from the application module 14 and executes it. For this reason, the processor 100 can always operate the new version of the firmware stored in the application module 14.

According to the present embodiment, since the processor 100 copies and executes the firmware corresponding to the communication protocol of the communication module 10, even if the communication module 10 is exchanged due to a change in the communication environment, a user can continuously use the existing application module 14 as long as the firmware corresponding to the communication protocol after the change is stored in the existing application module 14.

According to the present embodiment, since the loaded firmware is stored in the backup region 240 during the start-up process by the processor 100 and is copied to the firmware region 220 after the restart, the loaded firmware can be stably operated.

It is noted that the processor 100 may execute the firmware by directly reading out the firmware and data stored in the application module memory 142 without using the firmware memory 106. In this case, the processes shown in S404 and S406 of FIG. 4 and S504, S508 to S510, and S514 to S518 of FIG. 5 may be omitted. Instead of S408 of FIG. 4, the processor 100 may start up the common function of the firmware by executing an arbitrary piece of firmware stored in the application module memory 142. Then, in S506 of FIG. 5, the processor 100 determines whether or not there is firmware corresponding to the communication protocol supported by the communication module 10 in the application module memory 142 in response to receiving the attachment signal from the communication module 10 in S502. When there is firmware corresponding to the communication protocol inside the application module memory 142, instead of S512, the processor 100 may read out the firmware and the corresponding data inside the application module memory 142 and execute the specific function of the firmware. When there is no firmware corresponding to the communication protocol inside the application module memory 142, the processor 100 may move the process to S520 and transmit the error signal.

Figure 6:
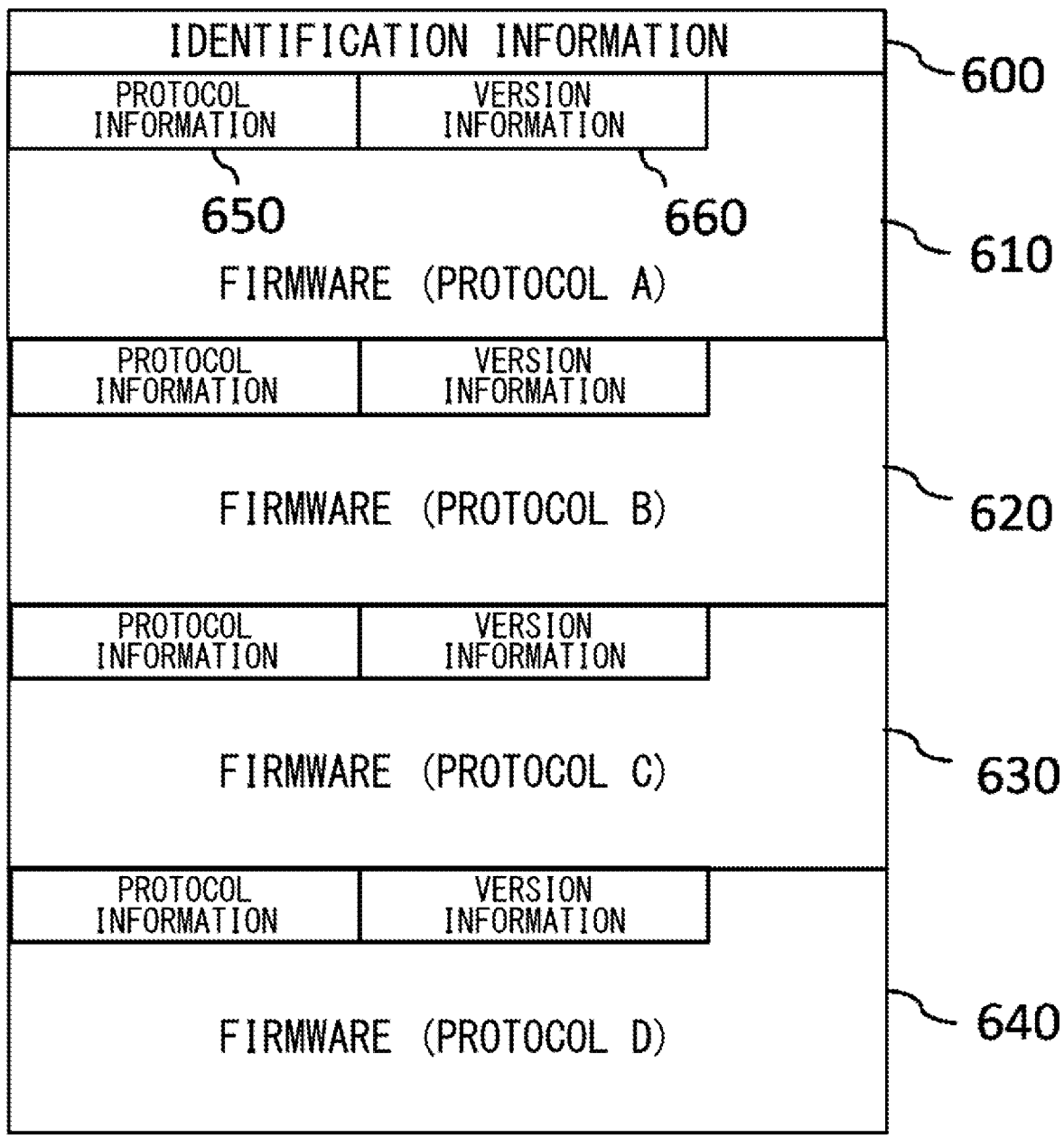
FIG. 6 shows a configuration of a download file to the application module memory 142 according to the present embodiment.

FIG. 6 shows a configuration of a download file to the application module memory 142 according to the present embodiment. The download file includes identification information 600, one or more pieces of firmware 610 to 640, and protocol information 650 and version information 660 corresponding to each piece of the firmware 610 to 640. The firmware 610 to 640 of the download file may each correspond to a different communication protocol. As an example, the firmware 610, 620, 630, and 640 may respectively correspond to a protocol A, B, C, and D. The firmware 610, 620, 630, and 640 may each have the same version information. In order to improve the development efficiency of the apparatus 6, the firmware 610 to 640 of the download file may be independently designed so as not to interfere with each other. The flow of downloading the download file shown in FIG. 6 to the application module memory 142 of the apparatus 6 will be described in detail below.

Figure 7:
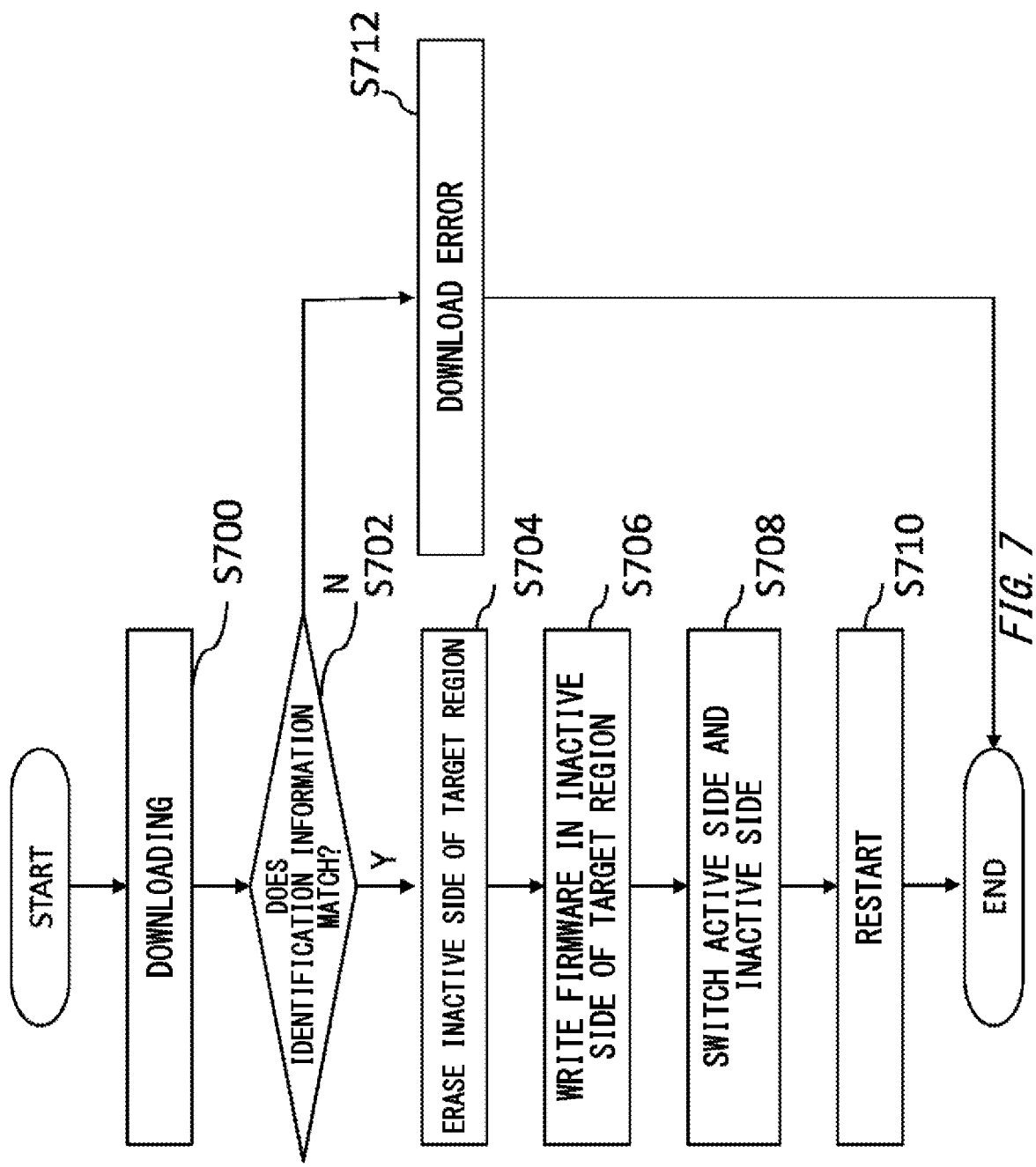
FIG. 7 shows a flow of downloading the download file to the application module memory 142 according to the present embodiment.

FIG. 7 shows a flow of downloading the download file according to the present embodiment to the application module memory 142. In S700, in response to a request from a connected device of the apparatus 6 (for example, the server 3, the terminal 4, or an external server), the processor 100 may receive the download file including the firmware from the connected device via the communication unit 102 and begin downloading.

In S702, the processor 100 determines whether or not the identification information 300 stored in the application module memory 142 and the identification information 600 of the download file match. When the processor 100 determines that the two pieces of identification information match, the processor 100 moves the process to S704, and when the processor 100 determines that the two pieces of identification information do not match, the processor 100 moves the process to S712.

In S704, the processor 100 erases the inactive region of the firmware region 310 inside the application module memory 142 in response to determining that the two pieces of identification information match in S702. For example, when the first firmware region 3000 is an active region, the firmware and the like inside the second firmware region 3200 may be erased.

In S706, the processor 100 writes and stores the firmware of the download file in the erased region of the firmware region 310 for each piece of protocol information.

In S708, the processor 100 activates the inactive region of the firmware region 310 and deactivates the active region. The processor 100 may perform switching of the active region and the inactive region in response to the writing of the firmware, and may perform the switching in response to a request from the connected device.

In S710, the processor 100 restarts the apparatus 6 and ends the process.

In S712, the processor 100 transmits an error signal indicating that the download file cannot be downloaded to the application module memory 142 in response to the determination in S702 that the two pieces of identification information do not match. The processor 100 may transmit the error signal to the connected device via the communication unit 102.

It is noted that instead of S704 to S706, in response to determining that the two pieces of identification information match in S702, the processor 100 may compare the protocol information of the firmware stored in the application module memory 142 and the download file, and when it is determined that the two pieces of protocol information 3002 and 650 match, the processor 100 may write the firmware of the download file to the inactive region of the target firmware region 310. When the processor 100 determines in S702 that the two pieces of protocol information do not match, the processor 100 may determine whether or not there is a free region in the application module memory 142, and when there is a free region, the processor 100 may write the firmware of the download file in the free region. When there is no free region, the processor 100 may transmit an error signal to the connected device.

In addition, the processor 100 may download only a specific piece of firmware from the download file. For example, when a failure is found in the firmware inside the application module 14 that is different from the operating firmware, the processor 100 can update only the failed firmware while the firmware is in operation.

As described above, the apparatus 6 updates the firmware by downloading the firmware from the connected device and storing it in the application module memory 142. Therefore, the user can always use the apparatus 6 holding the new version of the firmware without having to replace the application module 14 every time updated firmware is released. In addition, according to the apparatus 6, multiple pieces of firmware corresponding to different communication protocols inside the application module memory 142 can be updated collectively by one download operation. This saves the user from having to download firmware for each piece of firmware, simplifies version management, and greatly improves maintainability. In addition, the apparatus 6 can prepare firmware corresponding to a communication protocol to be used in the future using the currently operating firmware in advance, so that the apparatus 6 can be quickly shifted to a new communication environment. For a developer, since multiple pieces of firmware can be consolidated into one download file, the number of management steps can be significantly reduced. It is noted that according to the apparatus 6, the firmware of the download file can be written in the inactive region of the firmware region 310, and the immediately previous piece of firmware can be left in the active region. For this reason, even if a failure occurs during the download process, the apparatus 6 can easily be restored to the immediately previous state.

Figure 8:
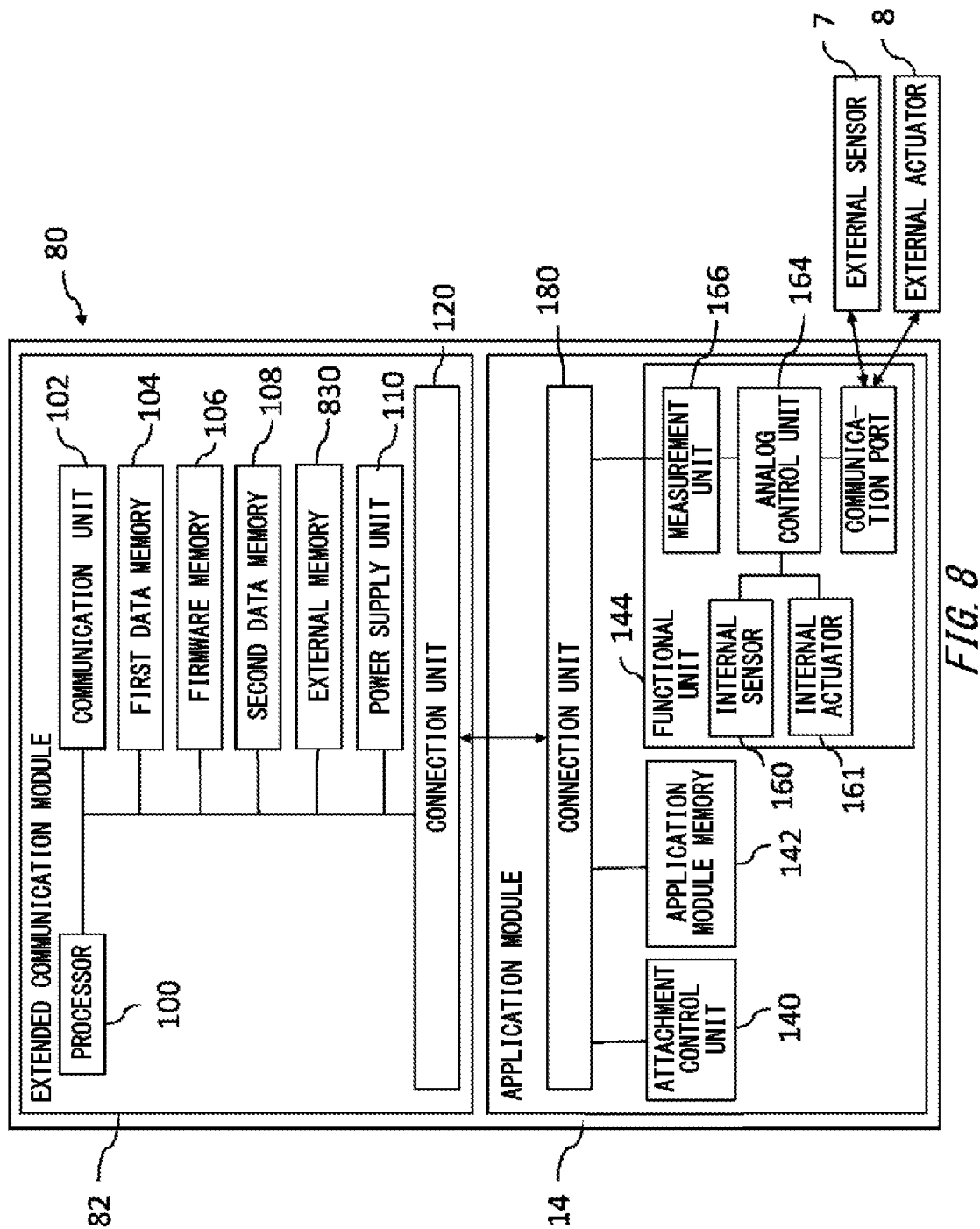
FIG. 8 shows an expansion apparatus 80 together with an external sensor 7 and an external actuator 8 according to the present embodiment.

FIG. 8 shows an expansion apparatus 80 together with the external sensor 7 and the external actuator 8 according to the present embodiment. In the present figure, the components denoted by the same reference numerals as those in FIG. 1 are basically the same as the description shown in FIG. 1 to FIG. 7, and therefore the following description will focus on the differences. The expansion apparatus 80 shown in FIG. 8 has the same configuration and function as the apparatus 6 shown in FIG. 1, except that the communication module 10 is an extension communication module 82 having an external memory 830.

The external memory 830 stores multiple pieces of firmware including one or more pieces of identification information. The external memory 830 may include a removable storage medium such as a USB memory or an SD card connected to the extension communication module 82.

The processor 100 reads out the firmware from the external memory 830 instead of receiving the upgraded multiple pieces of firmware from the connected device. The processor 100 may store the read out firmware to the application module memory 142 via the connection units 120 and 180. The processor 100 may store the firmware in the application module memory 142 by reading out the firmware in the external memory 830 at the time of start-up and performing the same processing as S702 to S712 of FIG. 7.

According to the expansion apparatus 80 described above, since the processor 100 can obtain the firmware from the external memory 830 inside the apparatus 6 without downloading the firmware from the connected device via the network 2, the firmware can be quickly obtained.

Figure 9:
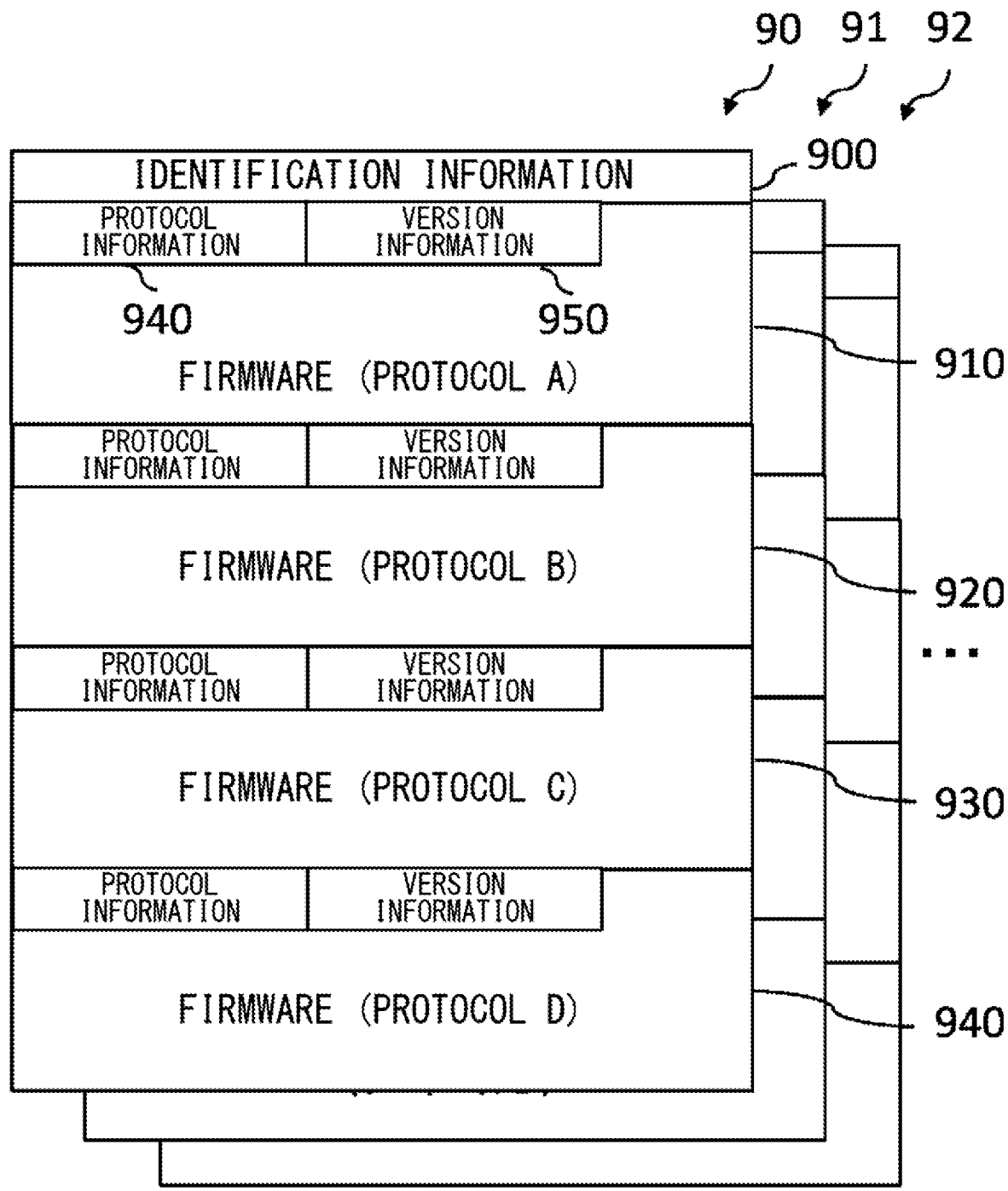
FIG. 9 shows a configuration of an external memory 830 according to the present embodiment.
Figure 10:
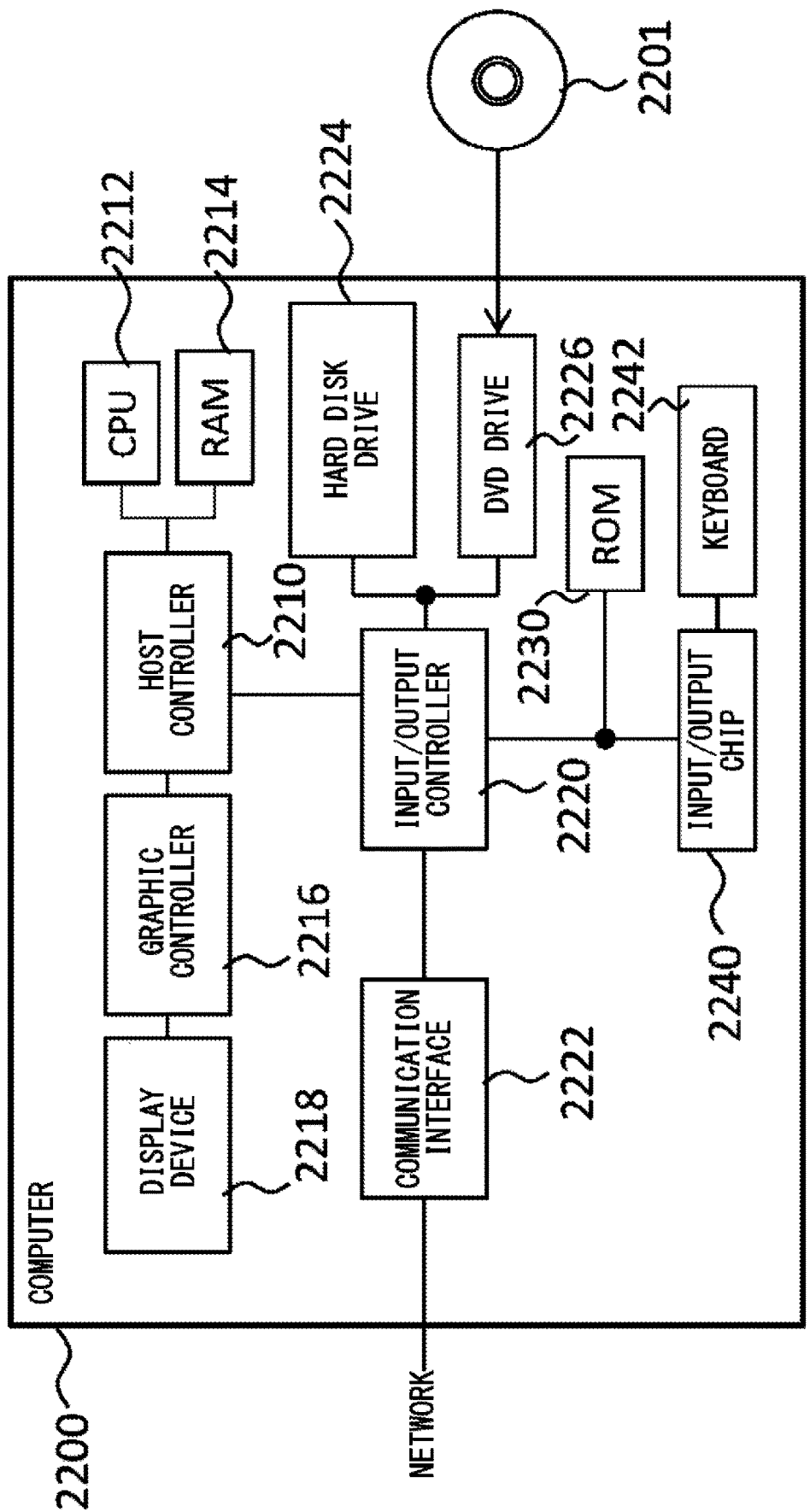
FIG. 10 shows an example of a computer 2200 in which plurality of the aspects of the present invention may be wholly or partially implemented.

FIG. 9 shows a configuration of the external memory 830 according to the present embodiment. The external memory 830 includes one or more external memory files 90 to 92. Each of the external memory files 90 to 92 includes, in association with identification information 900, multiple pieces of firmware 910 to 940, and protocol information 940 and version information 950 corresponding to each piece of the firmware 910 to 940.

As described above, since the external memory 830 may include the firmware including multiple pieces of the identification information 900, the application module 14 can select and store the appropriate firmware in the application module 14 at the time of attachment. Therefore, the user can use multiple types of the application module 14 in combination with one extension communication module 82. For example, the user can update the firmware of the multiple types of the application module 14 from one to the next simply by sequentially attaching one extension communication module 82 to the multiple types of the application module 14 and starting them up. Therefore, maintenance work on site is greatly reduced. It is noted that after a firmware update, even if the user removes the extension communication module 82 from the application module 14 and attaches the previous communication module 10, the new firmware can be used continuously.

The system 1 does not need to include the gateway 5. In addition, the application module 14 includes at least one of the integrated sensor 160, the integrated actuator 161, the external sensor 7, or the external actuator 8, and does not need to include all of them. Therefore, the functional unit 144 includes at least one of the integrated sensor 160, the integrated actuator 161, or the communication port 162, and does not need to include all of them.

Furthermore, the second data memory 108 may be stored with data relating to the functional unit 144 and the communication unit 102 by the processor 100 in addition to the first data memory 104 or instead of the first data memory 104. In this case, the first data memory 104 described in FIG. 5 may be replaced with the second data memory 108.

The attachment control unit 140 may be included in the communication module 10 or the extension communication module 82 instead of the application module 14. In this case, instead of S502 of FIG. 5, the processor 100 may determine whether or not the application module 14 is attached to the communication module 10 in response to the attachment control unit 140 detecting a physical change inside the connection unit 120. For example, the attachment control unit 140 may supply a current to the connection unit 120 in response to a request from the processor 100, and provide the attachment signal to the processor 100 in response to detecting a change in the resistance value inside the connection unit 120. When the processor 100 determines that the attachment signal has been received, the processor 100 moves the process to S504, and when the processor 100 determines that the attachment signal has not been received, the processor 100 returns the process to S502.

The apparatus 6 or the expansion apparatus 80 may include one or more application modules 14. When the apparatus 6 or the expansion apparatus 80 includes multiple application modules 14, one communication module 10 or one extension communication module 82 and the multiple application modules 14 may be coupled. The communication module 10 or the extension communication module 82 may include multiple connection units 120. In this case, the communication module 10 or the firmware memory 106 of the extension communication module 82 may include multiple firmware regions 220 and multiple backup regions 240 corresponding to the functional unit 144 of the multiple application modules 14 connected to the communication module 10 or the extension communication module 82 for storing the firmware. The processor 100 may obtain multiple pieces of firmware corresponding to the multiple application modules 14 connected to the communication module 10 or the extension communication module 82 from the application module memory 142 and execute the abovementioned various types of processes in a time-division or parallel manner.

Also, various embodiments of the present invention may be described with reference to flowcharts and block diagrams. Blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc. Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc. Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages. Computer-readable instructions may be provided to a processor of a general purpose computer, special purpose computer, or other programmable data processing apparatus, or to programmable circuitry, locally or via a local area network (LAN), a wide area network (WAN) such as the Internet, and the like. Thereby, the processor of a general purpose computer, special purpose computer, or other programmable data processing apparatus or the programmable circuitry can execute the computer-readable instructions so as to create means for performing operations specified in the flowcharts or block diagrams. Examples of the processor include a computer processor, a processing unit, a microprocessor, a digital signal processor, a controller, a microcontroller, and the like. FIG. 5 shows an example of a computer 2200 in which a plurality of aspects of the present invention may be wholly or partially embodied. A program installed on the computer 2200 can cause the computer 2200 to function as an operation associated with the apparatus according to an embodiment of the present invention or as one or more sections of the apparatus, or to execute the operation or the one or more sections. In addition or alternatively, the program can cause the computer 2200 to execute a process or steps of the process according to an embodiment of the present invention. Such a program may be executed by a CPU 2212 so as to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. In addition, the computer 2200 includes input/output units such as a communication interface 2222, a hard disk drive 2224, DVD-ROM drive 2226, or an IC card drive, and they are connected to the host controller 2210 via an input/output controller 2220. In addition, the computer includes legacy input/output units such as a ROM 2230 and a keyboard 2242, and they are connected to the input/output controller 2220 via an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data to be used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and additionally or alternatively writes the programs and data to the IC card.

The ROM 2230 stores therein at least one of a boot program or the like executed by the computer 2200 at the time of activation or a program that is dependent on the hardware of the computer 2200. The input/output chip 2240 may also connect various input/output units to the input/output controller 2220 via a parallel port, a serial port, a keyboard port, a mouse port or the like.

A program is provided by computer readable media such as the DVD-ROM 2201 or the IC card. The program is read from the computer readable media, installed into the hard disk drive 2224, the RAM 2214, or the ROM 2230, which are also examples of computer readable media, and is executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary unit of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of operations, information processing, conditional determination, conditional branching, unconditional branching, and various types of processes including information retrieval and replacement described in various places in the present disclosure and specified by the instruction sequence of the program on the data read from the RAM 2214, and write back the result to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer 2200 or in the computer readable media near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 System, 2 Network, 3 Server, 4 Terminal, 5 Gateway, 6 Apparatus, 7 External sensor, 8 External actuator, 10 Communication module, 14 Application module, 100 Processor, 102 Communication unit, 104 First data memory, 106 Firmware memory, 108 Second data memory, 110 Power supply unit, 120 Connection unit, 140 Attachment control unit, 142 Application module memory, 144 Functional unit, 160 Integrated sensor, 161 Integrated actuator, 162 Communication port, 164 Analog control unit, 166 Measurement unit, 180 Connection unit, 200 Boot loader region, 220 Firmware region, 222 Identification information, 224 Protocol information, 226 Version information, 240 Backup region, 242 Identification information, 244 Protocol information, 246 Version information, 300 Identification information, 310 Firmware region, 311-314 Firmware region, 320 Data region, 321-324 Data region, 3000 First firmware region, 3002 Protocol information, 3004 Version information, 3200 Second firmware region, 600 Identification information, 610-640 Firmware, 650 Protocol information, 660 Version information, 80 Extension apparatus, 82 Extension communication module, 830 External memory, 90-92 External memory file, 900 Identification information, 910 to 940 Firmware, 940 Protocol information, 950 Version information, 2200 Computer, 2201 DVD-ROM, 2210 Host controller, 2212 CPU, 2214 RAM, 2216 Graphic controller, 2218 Display device, 2220 Input/output controller, 2222 Communication interface, 2224 Hard disk drive, 2226 DVD-ROM drive, 2230 ROM, 2240 Input/output chip, 2242 Keyboard

What is claimed is:

1. An apparatus comprising:
a communication module comprising:
a connection unit for detachably coupling an application module including a functional unit including at least one of a sensor, an actuator, or a communication port that is to be connected to at least one of an external sensor or an external actuator;
a processor; and
a communication unit, wherein the processor executes firmware stored in an application module memory included in the application module that is coupled by the connection unit; and
the application module that is detachably coupled to the communication module, wherein the application module includes the functional unit, and the application module memory for storing the firmware that is executed by the processor,
wherein the communication module further includes a firmware memory including a firmware region for storing the firmware that is obtained from the application module memory, and the processor executes the firmware stored in the firmware region of the firmware memory, and
wherein the processor, during a start-up process, obtains identification information from the application module that is coupled to the communication module, and obtains the firmware stored in the application module memory and stores the firmware obtained from the application module memory in the firmware region of the firmware memory in response to the obtained identification information not matching identification information associated with the firmware stored in the firmware memory.

2. The apparatus according to claim 1, wherein
the processor, by executing the firmware, controls the functional unit and performs communication via the communication unit with a device to which the apparatus is connected.

3. The apparatus according to claim 1, wherein
the application module memory stores one or more pieces of firmware, each being the firmware, and
during the start-up process, the processor stores, in the firmware memory, the firmware that corresponds to a communication protocol used by the communication module among the one or more pieces of firmware stored in the application module memory.

4. The apparatus according to claim 1, wherein
the application module memory stores version information of the firmware in association with the firmware, and
during a start-up process, the processor determines whether or not to store the firmware stored in the application module memory in the firmware region of the firmware memory based on a result of comparing the version information of the firmware stored in the firmware memory and the version information associated with the firmware stored in the application module memory.

5. The apparatus according to claim 1, wherein
the processor, during the start-up process,
stores the firmware stored in the application module memory in a backup region of the firmware memory and restarts the processor, and
stores the firmware that is stored in the backup region of the firmware memory in the firmware region of the firmware memory during the restart.

6. The apparatus according to claim 1, wherein
the processor downloads a piece of firmware from a device to which the apparatus is connected and stores the downloaded firmware in the application module memory.

7. The apparatus according to claim 1, wherein
the application module memory is further stored with data relating to the at least one functional unit and the communication unit by the processor, and
the processor stores the data that is stored in the application module memory in a data memory inside the communication module and uses the data that is stored to perform processing.

8. An application module comprising:
a connection unit for detachably coupling a communication module including a processor, firmware memory including a firmware region, and a communication unit;
a functional unit including at least one of a sensor, an actuator, or a communication port that is to be connected to at least one of an external sensor or an external actuator; and an application module memory for storing firmware, wherein the application module is adapted to provide identification information to the communication module, and wherein the application module provides the firmware stored in the application module memory to the communication module for storage in the firmware region of the firmware memory and execution by the processor in response to the obtained identification information not matching identification information associated with the firmware stored in the firmware memory.

9. A method comprising:

coupling, by a communication module including a processor and a communication unit, the communication module and an application module detachable from the communication module, wherein the application module includes a functional unit including at least one of a sensor, an actuator, or a communication port that is to be connected to at least one of an external sensor or an external actuator, and includes an application module memory for storing firmware that is executed by the processor, wherein the communication module further includes a firmware memory including a firmware region for storing the firmware that is obtained from the application module memory;

obtaining identification information from the application module that is coupled to the communication module;

obtaining the firmware stored in the application module memory and storing the firmware obtained from the application module memory in the firmware region of the firmware memory in response to the obtained identification information not matching identification information associated with the firmware stored in the firmware memory; and executing, by the processor, the firmware stored in the firmware region of the firmware memory.

* * * * *